US012754412B2

(12) United States Patent
Ide et al.

(10) Patent No.: US 12,754,412 B2
(45) Date of Patent: Oct. 6, 2026

(54) OPTICAL MODULE

(71) Applicant: HAMAMATSU PHOTONICS K.K., Hamamatsu (JP)

(72) Inventors: Tomoyuki Ide, Hamamatsu (JP); Yuki Morinaga, Hamamatsu (JP); Mikito Takahashi, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 387 days.

(21) Appl. No.: 18/224,090

(22) Filed: Jul. 20, 2023

(65) Prior Publication Data

US 2024/0027747 A1 Jan. 25, 2024

(30) Foreign Application Priority Data

Jul. 25, 2022 (JP) ................................ 2022-118105

(51) Int. Cl.
*G02B 26/08* (2006.01)

(52) U.S. Cl.
CPC .................................. *G02B 26/085* (2013.01)

(58) Field of Classification Search
CPC ........................... G02B 26/085; G02B 26/101
See application file for complete search history.

(56) References Cited

U.S. PATENT DOCUMENTS

| | | | | |
|---|---|---|---|---|
| 2004/0105139 | A1* | 6/2004 | Hirose | G02B 26/085 359/199.3 |
| 2013/0094003 | A1 | 4/2013 | Abelè et al. | |
| 2018/0148314 | A1* | 5/2018 | Takimoto | B81B 3/001 |
| 2020/0174247 | A1* | 6/2020 | Suzuki | G02B 7/198 |

FOREIGN PATENT DOCUMENTS

| | | | |
|---|---|---|---|
| CN | 105280324 | A | 1/2016 |
| JP | 11-231252 | A | 8/1999 |
| JP | 2009-069339 | A | 4/2009 |
| JP | 2013-508785 | A | 3/2013 |
| JP | 2016-012042 | A | 1/2016 |
| JP | 2016029880 | A * | 3/2016 |
| WO | WO-2011/051620 | A2 | 5/2011 |

* cited by examiner

*Primary Examiner* — Shan Liu
(74) *Attorney, Agent, or Firm* — Faegre Drinker Biddle & Reath LLP

(57) ABSTRACT

An optical module includes: a mirror unit; and a magnet unit including first, second, and third magnets arranged along a first direction. The mirror unit is disposed on the magnet unit in a second direction perpendicular to the first direction. A width of the first magnet is equal to or more than widths of the second and third magnets. An upper surface of the first magnet is located on a mirror unit side with respect to upper surfaces of the second and third magnets in the second direction, or is located at the same position as one of the upper surfaces of the second and third magnets and on the mirror unit side with respect to the other of the upper surfaces of the second and third magnets in the second direction. The mirror unit is fixed to at least the upper surface of the first magnet.

18 Claims, 5 Drawing Sheets

OPTICAL MODULE

TECHNICAL FIELD

One aspect of the present disclosure relates to an optical module.

BACKGROUND

Japanese Unexamined Patent Publication No. 2013-508785 describes an optical module in which a mirror device including a movable mirror portion is disposed on a magnet unit. In the optical module, the magnet unit includes three magnets arranged along a lateral direction. The three magnets have magnetic directions different from each other. The mirror device is disposed across the three magnets.

SUMMARY

Technical Problem

The magnet unit as described above is formed by integrating the three magnets through bonding; however, since the magnets repel each other, when a plurality of the magnets are integrated (when the magnet unit is formed), the position of the magnet unit may deviate in an up-down direction, and a step portion may be formed on an upper surface of the magnet unit. When the mirror device is simply disposed on the upper surface of the magnet unit on which the step portion is formed, the inclination of the mirror device may deviate from a target angle. In addition, when the mirror device is adhered to the magnet unit, the adhesive strength (fixing strength) may decrease. From the viewpoint of reliability, the optical module is required to suppress a deviation in the inclination of or a decrease in the adhesive strength of the mirror device.

An object of one aspect of the present disclosure is to provide an optical module capable of enhancing reliability.

Solution to Problem

[1] According to one aspect of the present disclosure, there is provided "an optical module including: a mirror unit including a mirror device including a movable mirror portion provided with a coil; and a magnet unit including a first magnet, a second magnet, and a third magnet arranged along a first direction, and configured to generate a magnetic field acting on the movable mirror portion. The mirror unit is disposed on the magnet unit in a second direction perpendicular to the first direction. A width of the first magnet in the first direction is equal to or more than a width of the second magnet in the first direction and is equal to or more than a width of the third magnet in the first direction. An upper surface of the first magnet is located on a mirror unit side with respect to an upper surface of the second magnet and an upper surface of the third magnet in the second direction, or is located at the same position as one of the upper surface of the second magnet and the upper surface of the third magnet and on the mirror unit side with respect to the other of the upper surface of the second magnet and the upper surface of the third magnet in the second direction. The mirror unit is fixed to at least the upper surface of the first magnet."

In the optical module described in [1], the upper surface of the first magnet is located on the mirror unit side with respect to the upper surface of the second magnet and the upper surface of the third magnet, or is located at the same position as one of the upper surface of the second magnet and the upper surface of the third magnet and on the mirror unit side with respect to the other of the upper surface of the second magnet and the upper surface of the third magnet. The mirror unit is fixed to at least the upper surface of the first magnet. By fixing the mirror unit to the upper surface of the first magnet protruding in such a manner, a deviation in the inclination of and a decrease in the fixing strength of the mirror unit due to the influence of a step portion formed on an upper surface of the magnet unit can be suppressed. In addition, the width of the first magnet in the first direction is equal to or more than the width of the second magnet and the width of the third magnet in the first direction. By fixing the mirror unit to the upper surface of the first magnet that is wide, the mirror unit can be firmly fixed to the magnet unit. Further, by widening the width of the first magnet fixed to the mirror unit, the intensity distribution of a magnetic field generated by the magnet unit becomes smooth, and as a result, the movable mirror portion can be stably actuated. Therefore, according to the optical module described in [1], reliability can be enhanced.

[2] In the optical module according to one aspect of the present disclosure described in [1], "the width of the first magnet in the first direction may be wider than the width of the second magnet and the width of the third magnet in the first direction." In this case, the mirror unit can be more firmly fixed to the magnet unit. Further, the intensity distribution of a magnetic field generated by the magnet unit becomes smoother, and as a result, the movable mirror portion can be more stably actuated.

[3] In the optical module according to one aspect of the present disclosure described in [1] or [2], "the mirror unit may further include a base to which the mirror device is fixed, and the mirror unit may be fixed to at least the upper surface of the first magnet at the base." In this case, a deviation in the inclination of and a decrease in the fixing strength of the mirror unit including the base can be suppressed.

[4] In the optical module according to one aspect of the present disclosure described in [3], "the mirror unit may further include a wire connected to the mirror device and the base, and the wire may be connected to the base at a position overlapping the first magnet when viewed in the second direction." In this case, the wire can be satisfactorily connected to the base.

[5] In the optical module according to one aspect of the present disclosure described in [4], "the base may be formed with a wiring to which the wire is connected, and the wiring may be formed by disposing a metal material in a groove formed in the base." In this case, the wiring can be protected.

[6] In the optical module according to one aspect of the present disclosure described in any one of [1] to [5], "an outer edge of the mirror unit may be located outside an outer edge of the first magnet in the first direction." In this case, the mirror unit can be formed to be large in the first direction, so that the area of the movable mirror portion can be increased.

[7] In the optical module according to one aspect of the present disclosure described in any one of [1] to [6], "the first magnet, the second magnet, and the third magnet may be arranged in a Halbach array." In this case, the magnetic flux density in the vicinity of the coil (movable mirror portion) can be increased.

[8] In the optical module according to one aspect of the present disclosure described in any one of [1] to [7], "the mirror unit may be fixed to the upper surface of the first magnet by an adhesive material, and the adhesive material may not be disposed between the mirror unit and both the upper surface of the second magnet and the upper surface of the third magnet." In this case, an incident where the adhesive material disposed between the mirror unit and both the upper surface of the second magnet and the upper surface of the third magnet is peeled off to become foreign matter can be suppressed.

[9] In the optical module according to one aspect of the present disclosure described in any one of [1] to [8], "the first magnet may be sandwiched between the second magnet and the third magnet in the first direction." In this case, the mirror unit and the magnet unit can be disposed such that a magnetic field suitably acts on the movable mirror portion.

[10] In the optical module according to one aspect of the present disclosure described in any one of [1] to [9], "the width of the first magnet in the first direction may be wider than a width of the movable mirror portion in the first direction." In this case, a magnetic field with a relatively flat intensity distribution can act on the movable mirror portion, and the actuation of the movable mirror portion can be brought closer to an ideal actuation.

According to one aspect of the present disclosure, it is possible to provide the optical module capable of enhancing reliability.

DETAILED DESCRIPTION

Hereinafter, an embodiment of the present disclosure will be described in detail with reference to the drawings. In the following description, the same reference signs are used to denote the same or equivalent elements, and duplicate descriptions will be omitted.

Figure 1:
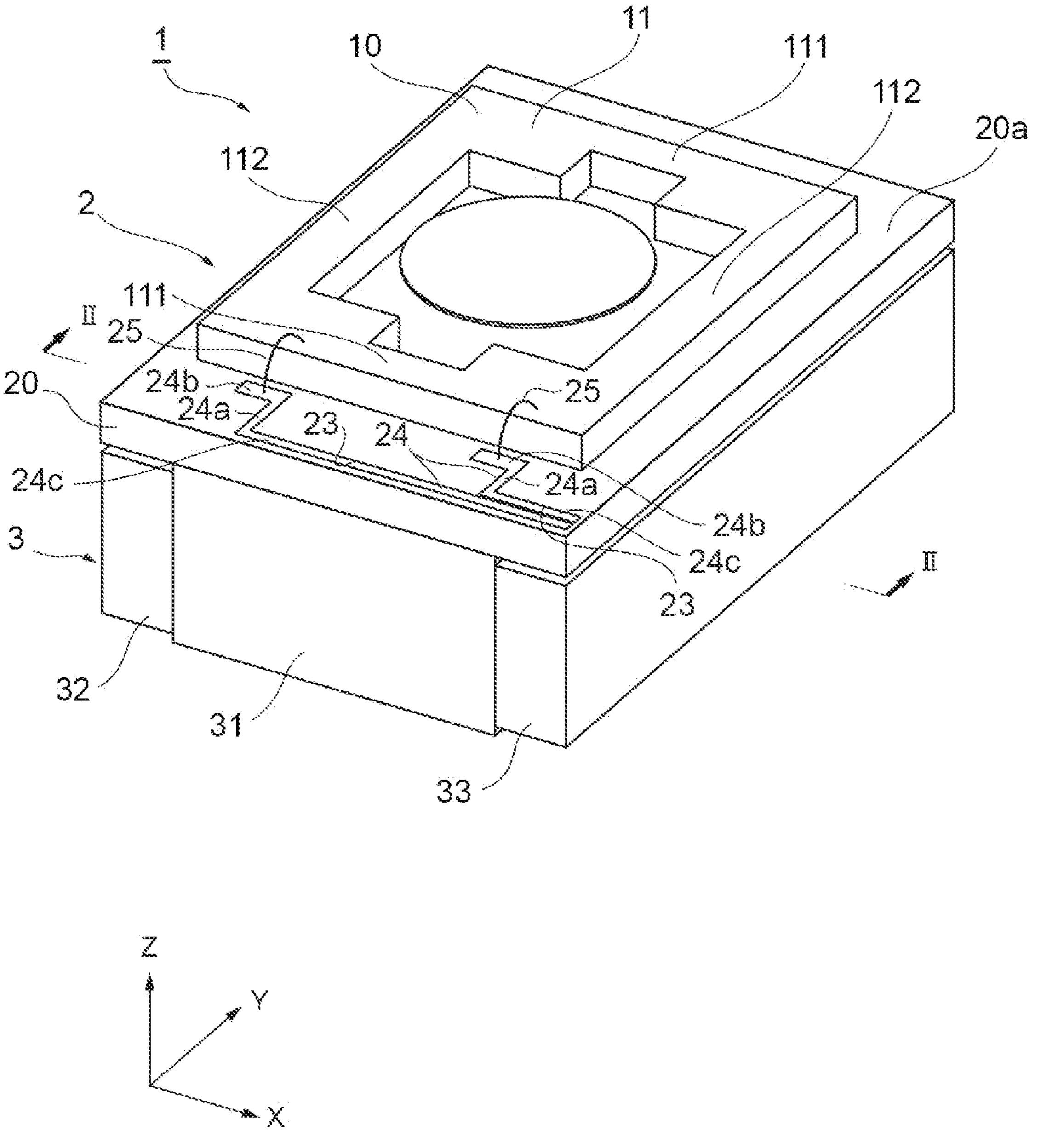
FIG. 1 is a perspective view of an optical module according to one embodiment.
Figure 2:
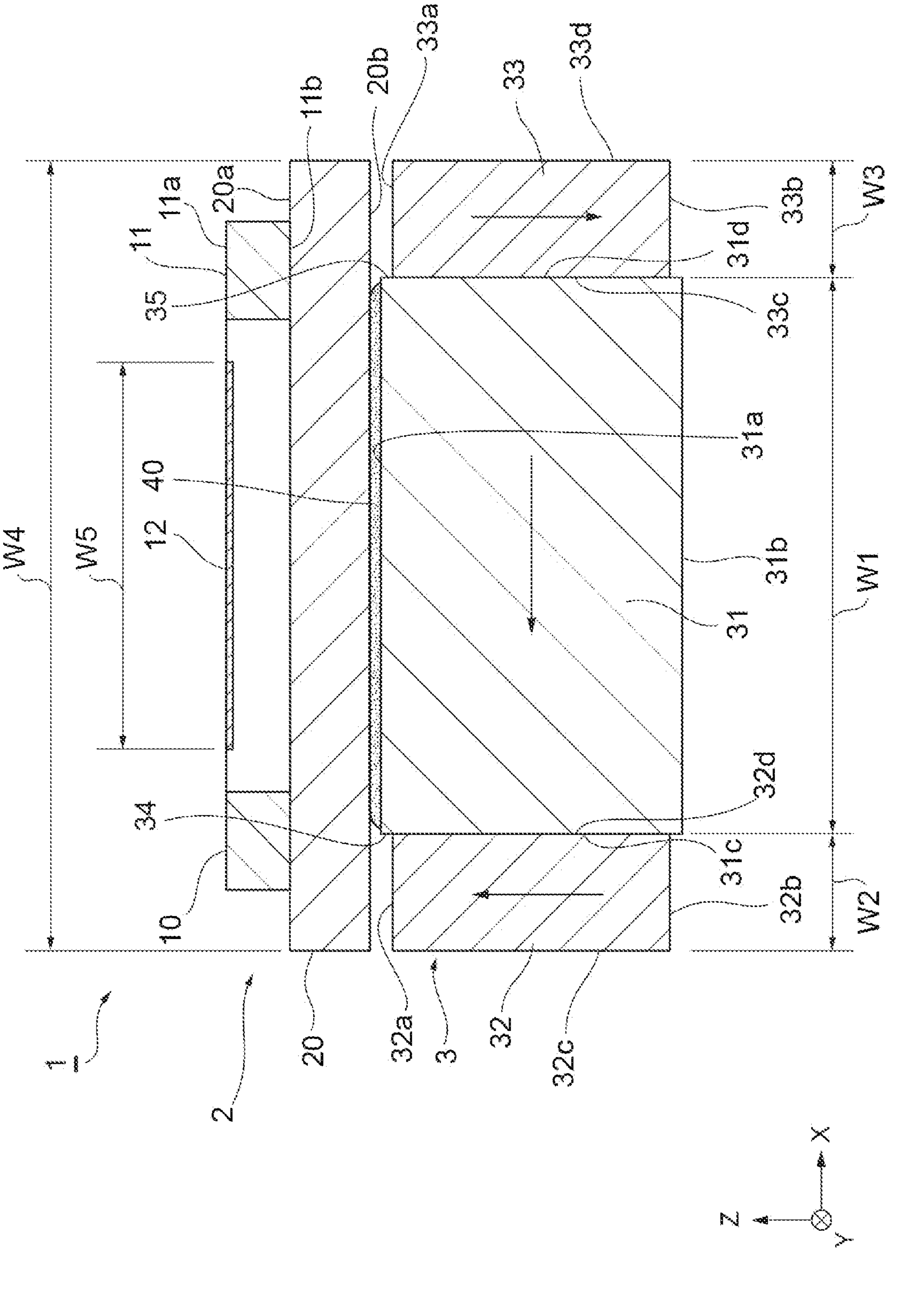
FIG. 2 is a cross-sectional view taken along line II-II in FIG. 1.
Figure 3:
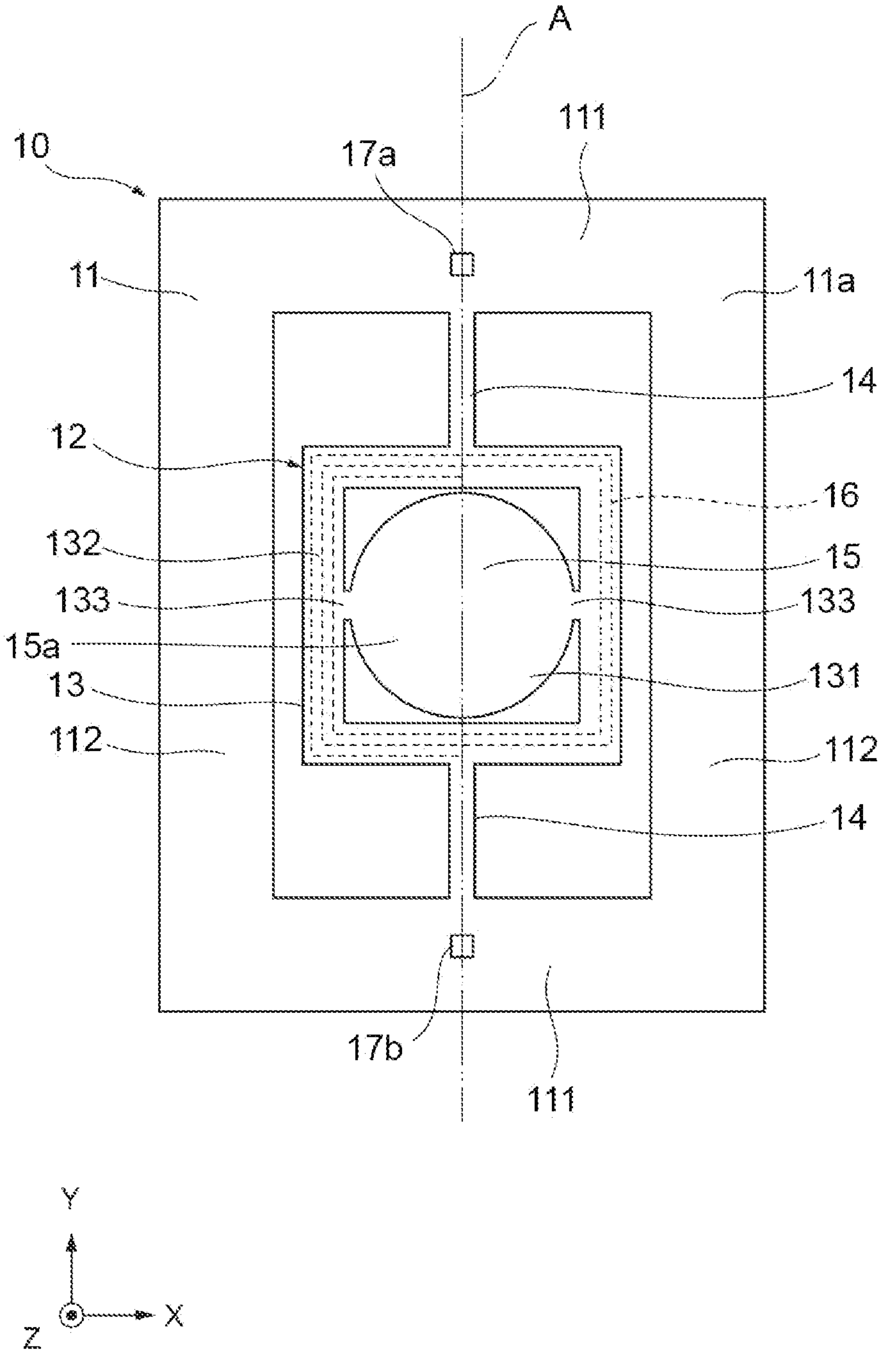
FIG. 3 is a plan view of a mirror device.

As shown in FIGS. 1, 2, and 3, an optical module 1 includes a mirror unit 2 and a magnet unit 3. In the following description, a width direction of the optical module 1 is referred to as an X direction (first direction), a length direction of the optical module 1 is referred to as a Y direction, and a thickness direction of the optical module 1 is referred to as a Z direction (second direction). The X direction, the Y direction, and the Z direction are orthogonal to each other. First, the mirror unit 2 will be described with reference to FIGS. 1 to 3. The mirror unit 2 is disposed on the magnet unit 3 in the Z direction. The mirror unit 2 includes a mirror device 10 and a base 20 to which the mirror device 10 is fixed.

The mirror device 10 includes a support portion 11 and a movable mirror portion 12. The movable mirror portion 12 includes a movable portion 13, a pair of connection portions 14, and a mirror 15. The support portion 11, the movable portion 13, and the pair of connection portions 14 are integrally formed by, for example, a silicon on insulator (SOI) substrate. The mirror device 10 is a micro electro mechanical systems (MEMS) device formed using a semiconductor material.

The support portion 11 is formed in a frame shape surrounding the movable mirror portion 12 with a gap therebetween when viewed in the Z direction. In this example, the support portion 11 is formed in a rectangular frame shape. The support portion 11 has an upper surface 11*a* and a bottom surface 11*b* opposite to the upper surface 11*a* in the Z direction. The upper surface 11*a* and the bottom surface 11*b* are surfaces perpendicular to the Z direction. The support portion 11 includes a pair of first side portions 111 and a pair of second side portions 112. The pair of first side portions 111 extend along the X direction, and are located to sandwich the movable mirror portion 12 therebetween in the Y direction. The pair of second side portions 112 extend along the Y direction, and are located to sandwich the movable mirror portion 12 therebetween in the X direction.

The movable mirror portion 12 is disposed inside a region delimited by the pair of first side portions 111 and the pair of second side portions 112 when viewed in an optical axis direction. The optical axis direction is a direction perpendicular to a plane on which the support portion 11 and the movable mirror portion 12 are disposed, and is a direction perpendicular to the mirror 15 in this example. In this example, the optical axis direction is parallel to the Z direction. The movable portion 13 is formed in a rectangular plate shape. The movable portion 13 is connected to the support portion 11 via the pair of connection portions 14 so as to be oscillatable around an axis A parallel to the Y direction. The movable portion 13 includes a first portion 131, a second portion 132, and a pair of third portions 133. The first portion 131 is formed in a circular shape when viewed in the optical axis direction. The second portion 132 is formed in a rectangular frame shape when viewed in the optical axis direction. The second portion 132 surrounds the first portion 131 with a gap interposed therebetween. The pair of third portions 133 connect the first portion 131 and the second portion 132. A gap is formed between the first portion 131 and the second portion 132 except for portions at which the pair of third portions 133 are located. The third portions 133 are located at the centers of two sides of an inner edge of the second portion 132, the two sides being parallel to the axis A.

The pair of connection portions 14 are disposed on the axis A in the gap between the support portion 11 and the movable portion 13 so as to sandwich the movable portion 13 therebetween. In this example, each of the connection portions 14 is formed in a rectangular plate shape, and extends along the axis A. Each of the connection portions 14 connects the first side portion 111 of the support portion 11 and the second portion 132 of the movable portion 13. Each of the connection portions 14 functions as a torsion bar.

The mirror 15 is formed on one surface of the first portion 131 included in the movable portion 13. The mirror 15 is, for example, formed in a circular film shape from a metal material such as aluminum, aluminum-based alloy, gold, or silver. A surface on an opposite side of the mirror 15 from the movable portion 13 forms a mirror surface 15*a* extending perpendicular to the optical axis direction. A center of the mirror 15 coincides with a center of the first portion 131 (center of the mirror device 10) when viewed in the optical axis direction. In the mirror device 10, since the mirror 15 is provided on the first portion 131 connected to the second portion 132 via a plurality (two in this example) of the third portions 133, even when the movable portion 13 oscillates around the axis A at a resonant frequency level, the occurrence of deformation such as bending in the mirror 15 can be suppressed.

The mirror device 10 is provided with a coil 16 and a pair of electrode pads 17*a* and 17*b*. The coil 16 is provided in the second portion 132 of the movable portion 13. The coil 16 is, for example, disposed in a groove formed in a surface of the second portion 132. Namely, the coil 16 is embedded in the movable portion 13. The coil 16 is wound multiple times in a spiral shape in the second portion 132 so as to surround the mirror 15 when viewed in the optical axis direction. A magnetic field generated by the magnet unit 3 acts on the coil 16. One end of the coil 16 is connected to the electrode pad 17*a* via a wiring (not shown), and the other end of the coil 16 is connected to the electrode pad 17*b* via a wiring (not shown). The coil 16 and the electrode pads 17*a* and 17*b* are made of, for example, a metal material such as copper. A wire (not shown) for electrically connecting the mirror device 10 to an external device (for example, a power supply device or the like) is connected to each of the electrode pads 17*a* and 17*b*.

An example of a method for driving the mirror device 10 will be described. As one example, a drive current of a high frequency is applied to the coil 16. At this time, since the magnetic field generated by the magnet unit 3 acts on the coil 16, a Lorentz force is generated in the coil 16. Accordingly, for example, the movable portion 13 is oscillated around the axis A at the resonant frequency level. Scanning can be performed with light from a predetermined light source by causing the mirror 15 (mirror surface 15*a*) to reflect the light through driving the mirror device 10 in such a manner. As another example, a drive current of a constant magnitude may be applied to the coil 16. In this case, the movable portion 13 rotates around the axis A according to the magnitude of the drive current, and stops at a predetermined rotation angle. In such a manner, the movable portion 13 may be statically driven (linear drive).

The base 20 will be described with reference to FIGS. 1 and 2. The base 20 is, for example, a wiring substrate on which the mirror unit 2 is mounted. The base 20 functions as a support member that supports the mirror device 10. The base 20 is, for example, a ceramic substrate. The base 20 is formed in a square or rectangular plate shape (rectangular plate shape in this example). The base 20 has an upper surface 20*a* and a bottom surface 20*b* opposite to the upper surface 20*a*. In this example, the upper surface 20*a* and the bottom surface 20*b* have a rectangular shape with long sides parallel to the Y direction when viewed in the Z direction.

The upper surface 20*a* of the base 20 is a surface on an opposite side of the base 20 from the magnet unit 3, and is a surface perpendicular to the Z direction. The mirror device 10 is disposed on the upper surface 20*a*. The first side portions 111 of the mirror device 10 are aligned along short sides of the upper surface 20*a*, and the second side portions 112 of the mirror device 10 are aligned along long sides of the upper surface 20*a*. The mirror device 10 is fixed to the base 20. For example, the mirror device 10 may be adhered (fixed) to the base 20 by an adhesive material disposed between the bottom surface 11*b* of the support portion 11 and the upper surface 20*a*. A width of the base 20 in the X direction is wider than a width of the mirror device 10 in the X direction. A length of the base 20 in the Y direction is longer than a length of the mirror device 10 in the Y direction. When viewed in the Z direction, an outer edge of the base 20 is located outside an outer edge of the mirror device 10.

A plurality (two in this example) of wirings 24 are formed on the base 20. In this example, the wirings 24 are formed by disposing (filling) a metal material in grooves 23 formed in the upper surface 20*a* of the base 20. The metal material forming the wirings 24 is, for example, gold, copper, aluminum, or the like. Each of the wirings 24 includes a first portion 24*a* extending along the Y direction; a second portion 24*b* extending along the X direction from one end of the first portion 24*a* (end portion on a mirror device 10 side); and a third portion 24*c* extending along the X direction from the other end of the first portion 24*a* (end portion opposite to the mirror device 10). A direction in which the second portion 24*b* extends from the first portion 24*a* in the X direction is opposite to a direction in which the third portion 24*c* extends from the first portion 24*a* in the X direction. The second portion 24*b* is disposed closer to the mirror device 10 than other portions of the wiring 24, and is provided to overlap the first magnet 31 when viewed in the Z direction. One end of a wire 25 for electrically connecting the mirror device 10 and the base 20 is connected to the second portion 24*b*. In such a manner, in this example, the wire 25 is connected to the wiring 24 at a position overlapping the first magnet 31 when viewed in the Z direction. The other end of the wire 25 is, for example, connected to an electrode pad (not shown) provided on the mirror device 10.

The bottom surface 20*b* of the base 20 is a surface on a magnet unit 3 side of the base 20, and forms a bottom surface of the mirror unit 2. The bottom surface 20*b* is a surface perpendicular to the Z direction, and faces the magnet unit 3. The base 20 may be formed, for example, by laminating a plurality of thin ceramic sheets.

The magnet unit 3 will be described with reference to FIGS. 1 and 2. The magnet unit 3 generates a magnetic field acting on the movable mirror portion 12 (coil 16). Hereinafter, a side on which the magnet unit 3 is located with respect to the mirror unit 2 in the Z direction will be described as a "lower side", and a side opposite to the lower side (side on which the mirror unit 2 is located with respect to the magnet unit 3) will be described as an "upper side". The "upper side" and the "lower side" coincide with an upper side and a lower side in FIGS. 1 and 2, respectively. The "upper side" and the "lower side" are set for the convenience of description, and do not limit usage modes of the optical module 1. For example, the optical module 1 may be used in a state where the set "upper side" faces the vertically lower side, or may be used in a state where the set "upper side" faces a horizontal direction.

The magnet unit 3 includes a plurality of magnets arranged along the X direction. In this example, the magnet unit 3 includes a first magnet 31, a second magnet 32, and a third magnet 33. The first magnet 31, the second magnet 32, and the third magnet 33 are formed of, for example, permanent magnets. The first magnet 31 (central magnet) is sandwiched between the second magnet 32 and the third magnet 33 in the X direction. Namely, the third magnet 33 is disposed opposite to the second magnet 32 with respect to the first magnet 31 in the X direction.

The first magnet 31 is formed in a rectangular parallelepiped shape. A longitudinal direction of the first magnet 31 is aligned along the Y direction, and a lateral direction of the first magnet 31 is aligned along the X direction. The first magnet 31 has an upper surface 31*a*, a bottom surface 31*b*, and a pair of side surfaces 31*c* and 31*d* extending from the upper surface 31*a* to the bottom surface 31*b*. The upper surface 31*a* and the bottom surface 31*b* are flat surfaces perpendicular to the Z direction. The upper surface 31*a* is a surface on the upper side of the first magnet 31, and faces the bottom surface 20*b* of the base 20. An adhesive material 40 to be described later is disposed between the upper surface 31*a* and the bottom surface 20*b*. Namely, the upper surface 31*a* is in contact with the bottom surface 20*b* via the adhesive material 40. The bottom surface 31*b* is a surface on the lower side of the first magnet 31. Each of the side surfaces 31*c* and 31*d* is a flat surface perpendicular to the X direction. The side surface 31*c* is located on a second magnet 32 side in the X direction, and the side surface 31*d* is located on a third magnet 33 side in the X direction.

The second magnet 32 is formed in a rectangular parallelepiped shape. A longitudinal direction of the second magnet 32 is aligned along the Y direction, and a lateral direction of the second magnet 32 is aligned along the X direction. The second magnet 32 has an upper surface 32*a*, a bottom surface 32*b*, and a pair of side surfaces 32*c* and 32*d* extending from the upper surface 32*a* to the bottom surface 32*b*. The upper surface 32*a* and the bottom surface 32*b* are flat surfaces perpendicular to the Z direction. The upper surface 32*a* is a surface on the upper side of the second magnet 32, and faces the bottom surface 20*b* of the base 20. The upper surface 32*a* is spaced apart from the bottom surface 20*b*. The bottom surface 32*b* is a surface on the lower side of the second magnet 32. In the present embodiment, a length of the second magnet 32 in the Z direction (distance between the upper surface 32*a* and the bottom surface 32*b*) is shorter than a length of the first magnet 31 in the Z direction (distance between the upper surface 31*a* and the bottom surface 31*b*).

Each of the side surfaces 32*c* and 32*d* is a flat surface perpendicular to the X direction. The side surface 32*c* is located opposite to the first magnet 31 in the X direction. The side surface 32*c* is a surface facing the outside of the magnet unit 3. The side surface 32*d* is located on a first magnet 31 side in the X direction, and is in contact with the side surface 31*c* of the first magnet 31. The second magnet 32 is fixed to the first magnet 31. For example, the second magnet 32 may be adhered (fixed) to the first magnet 31 by an adhesive material disposed between the side surface 32*d* and the side surface 31*c*. A method for fixing the second magnet 32 to the first magnet 31 is not limited, and may be, for example, fixation using insert resin, plasma bonding, thermal bonding, or the like.

The third magnet 33 is formed in a rectangular parallelepiped shape. A longitudinal direction of the third magnet 33 is aligned along the Y direction, and a lateral direction of the third magnet 33 is aligned along the X direction. The third magnet 33 has an upper surface 33*a*, a bottom surface 33*b*, and a pair of side surfaces 33*c* and 33*d* extending from the upper surface 33*a* to the bottom surface 33*b*. The upper surface 33*a* and the bottom surface 33*b* are flat surfaces perpendicular to the Z direction. The upper surface 33*a* is a surface on the upper side of the third magnet 33, and faces the bottom surface 20*b* of the base 20. The upper surface 33*a* is spaced apart from the bottom surface 20*b*. The bottom surface 33*b* is a surface on the lower side of the third magnet 33. In the present embodiment, a length of the third magnet 33 in the Z direction (distance between the upper surface 33*a* and the bottom surface 33*b*) is shorter than a length of the first magnet 31 in the Z direction.

Each of the side surfaces 33*c* and 33*d* is a flat surface perpendicular to the X direction. The side surface 33*c* is located on the first magnet 31 side in the X direction, and is in contact with the side surface 31*d* of the first magnet 31. The third magnet 33 is fixed to the first magnet 31. For example, the third magnet 33 may be adhered (fixed) to the first magnet 31 by an adhesive material disposed between the side surface 33*c* and the side surface 31*d*. A method for fixing the third magnet 33 to the first magnet 31 is not limited, and may be, for example, fixation using insert resin, plasma bonding, thermal bonding, or the like. In this example, the first magnet 31, the second magnet 32, and the third magnet 33 are integrated to form one magnetic body by fixing the second magnet 32 and the third magnet 33 to the first magnet 31. The side surface 33*d* is located opposite to the first magnet 31 in the X direction. The side surface 33*d* is a surface facing the outside of the magnet unit 3.

The upper surface 31*a* of the first magnet 31 is located on the upper side (mirror unit 2 side) with respect to the upper surface 32*a* of the second magnet 32. In other words, the upper surface 31*a* protrudes to the upper side with respect to the upper surface 32*a*. Accordingly, a step portion 34 is formed between the upper surface 31*a* and the upper surface 32*a*. Namely, the step portion 34 is formed due to the position of the upper surface 31*a* being different from the position of the upper surface 32*a* in the Z direction.

The upper surface 31*a* of the first magnet 31 is located on the upper side with respect to the upper surface 33*a* of the third magnet 33. In other words, the upper surface 31*a* protrudes to the upper side with respect to the upper surface 33*a*. Accordingly, a step portion 35 is formed between the upper surface 31*a* and the upper surface 33*a*. Namely, the step portion 35 is formed due to the position of the upper surface 31*a* being different from the position of the upper surface 33*a* in the Z direction. In this example, the upper surface 32*a* and the upper surface 33*a* are located on the same plane. In the Z direction, a minimum value of a distance between the bottom surface 20*b* of the mirror unit 2 and both the upper surface 32*a* and the upper surface 33*a* is larger than a minimum value of a distance between the upper surface 31*a* and the bottom surface 20*b*.

A width W1 of the first magnet 31 is wider than a width W2 of the second magnet 32 and a width W3 of the third magnet 33. Namely, the first magnet 31 is a magnet with a widest width among the plurality of magnets included in the magnet unit 3. The width W1 of the first magnet 31 is a maximum width of the first magnet 31 in the X direction. The width W2 of the second magnet 32 is a maximum width of the second magnet 32 in the X direction. The width W3 of the third magnet 33 is a maximum width of the third magnet 33 in the X direction. In this example, the width W2 and the width W3 are equal to each other. The width W1 is, for example, equal to or more than two times the width W2 and the width W3, and is equal to or more than four times in this example. In this example, a length of the first magnet 31 in the Y direction is slightly longer than a length of the second magnet 32 and the third magnet 33 in the Y direction.

A width W4 of the mirror unit 2 is wider than the width W1 of the first magnet 31. The width W4 of the mirror unit 2 is a maximum width of the mirror unit 2 in the X direction, and is a width of the base 20 in this example. A width of the mirror unit 2 in the Y direction is equal to a width of the first magnet 31 in the Y direction. The width of the mirror unit 2 in the Y direction is a maximum width of the mirror unit 2 in the Y direction, and is a width of the base 20 in this example. In the X direction, an outer edge of the mirror unit 2 (outer edge of the base 20 in this example) is located outside an outer edge of the first magnet 31. In the Y direction, the outer edge of the mirror unit 2 is located at the same position as the outer edge of the first magnet 31. The mirror unit 2 overlaps the first magnet 31, the second magnet 32, and the third magnet 33 in the Z direction.

The width W1 of the first magnet 31 is wider than a width W5 of the movable mirror portion 12. The width W5 of the movable mirror portion 12 is a maximum width of the movable mirror portion 12 in the X direction, and is a width of the second portion 132 included in the movable portion 13 in this example. When viewed in the Z direction, the movable mirror portion 12 is located inside the outer edge of the first magnet 31. Therefore, when viewed in the Z direction, the coil 16 is located inside the outer edge of the first magnet 31.

The mirror unit 2 is fixed to the upper surface 31*a* of the first magnet 31 at the base 20. In the present embodiment, the mirror unit 2 is adhered (fixed) to the upper surface 31*a* by the adhesive material 40. The adhesive material 40 is disposed between the bottom surface 20*b* of the base 20 and the upper surface 31*a*. The adhesive material 40 is in contact with the bottom surface 20*b* and the upper surface 31*a*. The adhesive material 40 is not disposed between the mirror unit 2 and both the upper surface 32*a* of the second magnet 32 and the upper surface 33*a* of the third magnet 33, and the mirror unit 2 is not fixed to the upper surface 32*a* and the upper surface 33*a*. Namely, the adhesive material 40 is not in contact with the upper surface 32*a* and the upper surface 33*a*. The adhesive material 40 is disposed only on the upper surface 31*a*, and does not reach the upper surface 32*a* and the upper surface 33*a*.

The first magnet 31, the second magnet 32, and the third magnet 33 are arranged in a Halbach array. Namely, the first magnet 31, the second magnet 32, and the third magnet 33 are arranged such that two magnetic poles included in each magnet are arranged in a Halbach array. In FIG. 2, the magnetic poles of each magnet are indicated by arrows. Directions indicated by the arrows are directions from first magnetic poles (for example, N poles) toward second magnetic poles (for example, S poles). In this example, the first magnetic pole of the first magnet 31 is located on the third magnet 33 side, and the second magnetic pole of the first magnet 31 is located on the second magnet 32 side. The first magnetic pole of the second magnet 32 is located on a bottom surface 32*b* side, and the second magnetic pole of the second magnet 32 is located on an upper surface 32*a* side. The magnetic poles of the third magnet 33 are located in a direction opposite to that of the magnetic poles of the second magnet 32. Namely, the first magnetic pole of the third magnet 33 is located on an upper surface 33*a* side, and the second magnetic pole of the third magnet 33 is located on a bottom surface 33*b* side. When the first magnet 31, the second magnet 32, and the third magnet 33 are arranged in such a Halbach array, for example, a force acts on the first magnet 31 in a direction from the mirror unit 2 toward the magnet unit 3, and a force acts on the second magnet 32 and the third magnet 33 in a direction from the magnet unit 3 toward the mirror unit 2 (direction opposite to a force acting on the first magnet 31).

FUNCTIONS AND EFFECTS

In the optical module 1, the upper surface 31*a* of the first magnet 31 is located on the mirror unit 2 side with respect to the upper surface 32*a* of the second magnet 32 and the upper surface 33*a* of the third magnet 33, and the mirror unit 2 is fixed to the upper surface 31*a* of the first magnet 31. By fixing the mirror unit 2 to the upper surface 31*a* of the first magnet 31 protruding in such a manner, a deviation in the inclination (decrease in parallelism) of and a decrease in the fixing strength (adhesive strength) of the mirror unit 2 due to the influence of the step portions 34 and 35 formed on the upper surface of the magnet unit 3 can be suppressed. In addition, the width W1 of the first magnet 31 in the X direction is wider than the width W2 of the second magnet 32 and the width W3 of the third magnet 33 in the X direction. By fixing the mirror unit 2 to the upper surface 31*a* of the first magnet 31 that is wide in width, the mirror unit 2 can be firmly fixed to the magnet unit 3. Further, by widening the width W1 of the first magnet 31 fixed to the mirror unit 2, the intensity distribution of a magnetic field generated by the magnet unit 3 becomes smooth, and as a result, the movable mirror portion 12 can be stably actuated. Therefore, according to the optical module 1, reliability can be enhanced. In addition, in the magnet unit 3 of the optical module 1, since the upper surface 31*a* of the first magnet 31 may protrude from the upper surface 32*a* of the second magnet 32 and the upper surface 33*a* of the third magnet 33, for example, compared to when a plurality of magnets are integrated through adhesion so as not to form a step portion therebetween, high adhesion accuracy is not required during the manufacture of the magnet unit 3.

The mirror unit 2 includes the base 20 to which the mirror device 10 is fixed, and the mirror unit 2 is fixed to the upper surface 31*a* of the first magnet 31 at the base 20. Accordingly, a deviation in the inclination of and a decrease in the fixing strength of the mirror unit 2 including the base 20 can be suppressed.

The mirror unit 2 includes the wires 25 connected to the mirror device 10 and the base 20. The wires 25 are connected to the base 20 at the positions overlapping the first magnet 31 when viewed in the Z direction. Accordingly, the wires 25 can be satisfactorily connected to the base 20. Namely, when connection portions (first portions 24*a*) of the wirings 24 to the wires 25 are located on the second magnet 32 or the third magnet 33, the existence of voids between the base 20 and both the second magnet 32 and the third magnet 33 makes it difficult to connect the wires 25 to the wirings 24 of the base 20, and decreases connection strength between the wires 25 and the wirings 24. In contrast, when the connection portions of the wirings 24 to the wires 25 are located on the first magnet 31, such a situation can be suppressed, and the wires 25 can be satisfactorily connected to the base 20.

The wirings 24 to which the wires 25 are connected are formed on the base 20, and the wirings 24 are formed by disposing a metal material in the grooves 23 formed in the base 20. Accordingly, the wirings 24 can be protected.

In the X direction, the outer edge of the mirror unit 2 is located outside the outer edge of the first magnet 31. Accordingly, the mirror unit 2 can be formed to be large in the X direction, so that the area of the movable mirror portion 12 can be increased.

The first magnet 31, the second magnet 32, and the third magnet 33 are arranged in a Halbach array. Accordingly, the magnetic flux density in the vicinity of the coil 16 (movable mirror portion 12) can be increased.

The mirror unit 2 is fixed to the upper surface 31*a* of the first magnet 31 by the adhesive material 40, and the adhesive material 40 is not disposed between the mirror unit 2 and both the upper surface 32*a* of the second magnet 32 and the upper surface 33*a* of the third magnet 33. Accordingly, an incident where the adhesive material 40 disposed between the mirror unit 2 and both the upper surface 32*a* of the second magnet 32 and the upper surface 33*a* of the third magnet 33 is peeled off to become foreign matter can be suppressed.

The first magnet 31 is sandwiched between the second magnet 32 and the third magnet 33 in the X direction. Accordingly, the mirror unit 2 and the magnet unit 3 can be disposed such that a magnetic field suitably acts on the movable mirror portion 12.

The width W1 of the first magnet 31 in the X direction is wider than the width W5 of the movable mirror portion 12 in the X direction. Accordingly, a magnetic field with a relatively flat intensity distribution can act on the movable mirror portion 12, and the actuation of the movable mirror portion 12 can be brought closer to an ideal actuation.

MODIFICATION EXAMPLES

Figure 4:
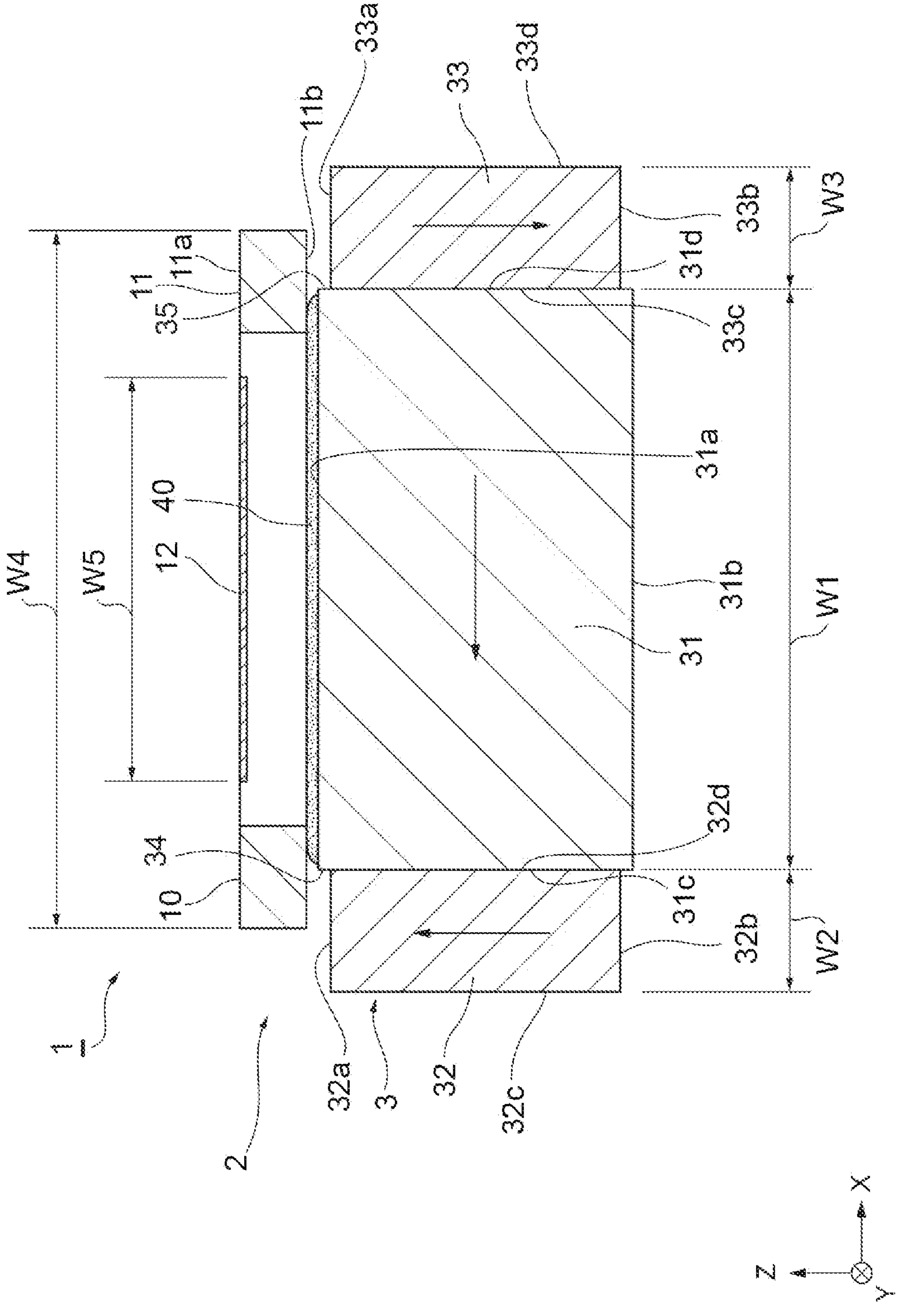
FIG. 4 is a cross-sectional view of an optical module according to a first modification example.

In the optical module 1 according to a first modification example shown in FIG. 4, the mirror unit 2 does not include the base 20, and includes only the mirror device 10. Therefore, the mirror device 10 is disposed on the magnet unit 3 without the base 20 interposed therebetween. The bottom surface 11*b* of the support portion 11 included in the mirror device 10 faces the magnet unit 3. Specifically, the bottom surface 11*b* faces the upper surface 31*a* of the first magnet 31, the upper surface 32*a* of the second magnet 32, and the upper surface 33*a* of the third magnet 33.

In the first modification example as well, the upper surface 31*a* of the first magnet 31 is located on the upper side with respect to the upper surface 32*a* of the second magnet 32 and the upper surface 33*a* of the third magnet 33. In other words, the upper surface 31*a* protrudes the upper side with respect to the upper surface 32*a* and the upper surface 33*a*. Accordingly, the step portion 34 is formed between the upper surface 31*a* and the upper surface 32*a*, and the step portion 35 is formed between the upper surface 31*a* and the upper surface 33*a*. In addition, the width W1 of the first magnet 31 is wider than the width W2 of the second magnet 32 and the width W3 of the third magnet 33.

In the first modification example, the mirror unit 2 is fixed to the upper surface 31*a* of the first magnet 31 at the mirror device 10. The mirror unit 2 is adhered (fixed) to the upper surface 31*a* by the adhesive material 40. The adhesive material 40 is disposed between the bottom surface 11*b* of the support portion 11 and the upper surface 31*a*. The adhesive material 40 is in contact with the bottom surface 11*b* and the upper surface 31*a*. The adhesive material 40 is not disposed between the mirror unit 2 (mirror device 10) and both the upper surface 32*a* of the second magnet 32 and the upper surface 33*a* of the third magnet 33. Namely, the adhesive material 40 is not in contact with the upper surface 32*a* and the upper surface 33*a*. The adhesive material 40 is disposed only on the upper surface 31*a*, and does not reach the upper surface 32*a* and the upper surface 33*a*. According to the first modification example as well, similarly to the embodiment, reliability can be enhanced.

The present disclosure is not limited to the embodiment and the modification example. For example, the material and the shape of each configuration are not limited to the material and the shape described above, and various materials and shapes can be adopted. The width W1 of the first magnet 31 may be equal to the width W5 of the movable mirror portion 12, or may be narrower than the width W5. When viewed in the Z direction, the outer edge of the mirror unit 2 may coincide with the outer edge of the first magnet 31, or may be located inside the outer edge of the first magnet 31.

The upper surface 31*a* of the first magnet 31 may be located at the same position as one of the upper surface 32*a* of the second magnet 32 and the upper surface 33*a* of the third magnet 33 and on the mirror unit 2 side with respect to the other of the upper surface 32*a* of the second magnet 32 and the upper surface 33*a* of the third magnet 33 in the Z direction. For example, the upper surface 31*a* may be located at the same position as the upper surface 32*a*, but may be located on the mirror unit 2 side with respect to the upper surface 33*a*. Alternatively, the upper surface 31*a* may be located at the same position as the upper surface 33*a*, but may be located on the mirror unit 2 side with respect to the upper surface 32*a*. In these cases as well, since the upper surface 31*a* protrudes to the mirror unit 2 side with respect to the upper surface 32*a* or the upper surface 33*a*, by fixing the mirror unit 2 to the upper surface 31*a*, a deviation in the inclination of and a decrease in the fixing strength the mirror unit 2 due to the influence of the step portions formed on the upper surface of the magnet unit 3 can be suppressed. As a result, similarly to the embodiment, the reliability of the optical module 1 can be enhanced.

The length of the second magnet 32 and the third magnet 33 in the Z direction may coincide with the length of the first magnet 31 in the Z direction. In this case, by disposing the second magnet 32 and the third magnet 33 on the lower side with respect to the first magnet 31, the upper surface 31*a* of the first magnet 31 may be set to protrude to the upper side with respect to the upper surface 32*a* of the second magnet 32 and the upper surface 33*a* of the third magnet 33.

The adhesive material 40 may be in contact with the upper surface 32*a* of the second magnet 32 and the upper surface 33*a* of the third magnet 33. Namely, the adhesive material 40 may be disposed not only between the mirror unit 2 and the first magnet 31 but also between the mirror unit 2 and both the second magnet 32 and the third magnet 33. In this case, the mirror unit 2 may be fixed to the upper surface 32*a* and the upper surface 33*a*. Namely, the mirror unit 2 may be fixed to at least the upper surface 31*a* of the first magnet 31, and may be fixed to one or both of the upper surface 32*a* and the upper surface 33*a*.

Figure 5:
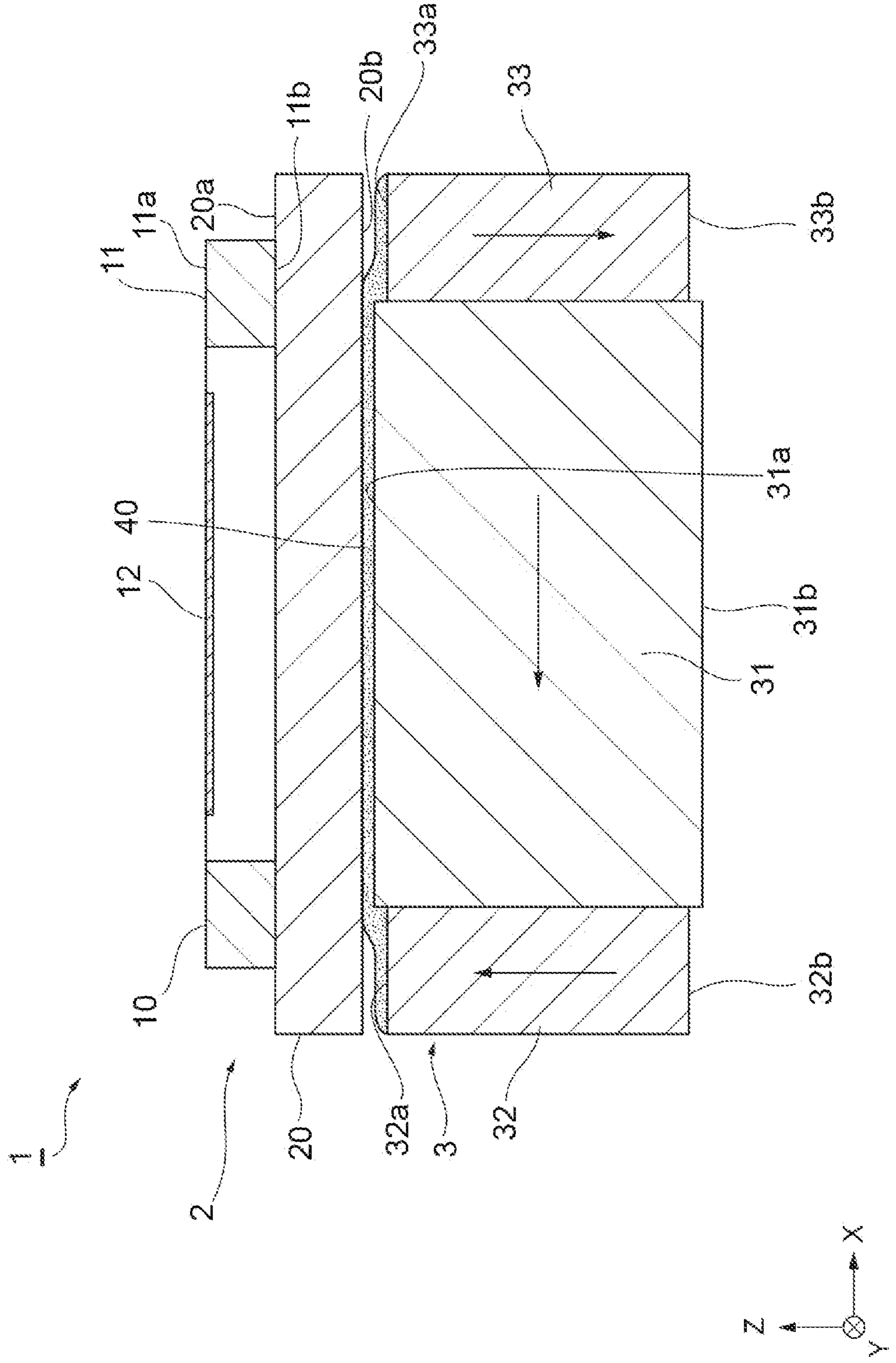
FIG. 5 is a cross-sectional view of an optical module according to a second modification example.

For example, the adhesive material 40 may be provided as in a second modification example shown in FIG. 5. In the second modification example, the adhesive material 40 may be disposed not only between the mirror unit 2 and the first magnet 31 but also between the mirror unit 2 and both the second magnet 32 and the third magnet 33, and the mirror unit 2 may be fixed not only to the upper surface 31*a* of the first magnet 31 but also to the upper surface 32*a* of the second magnet 32 and the upper surface 33*a* of the third magnet 33. The adhesive material 40 disposed on the upper surface 32*a* is in contact with the mirror unit 2 at a boundary portion between the upper surface 32*a* and the upper surface 31*a*, and is not in contact with the mirror unit 2 on a side opposite to the upper surface 31*a*. Similarly, the adhesive material 40 disposed on the upper surface 33*a* is in contact with the mirror unit 2 at a boundary portion between the upper surface 33*a* and the upper surface 31*a*, and is not in contact with the mirror unit 2 on a side opposite to the upper surface 31*a*. Incidentally, the adhesive material 40 may be disposed (filled) in the entirety of gaps between the mirror unit 2 and both the second magnet 32 and the third magnet 33. Namely, the adhesive material 40 may be in contact with the mirror unit 2 in the X direction over its entirety.

In the embodiment, the width W1 of the first magnet 31 is wider than the width W2 of the second magnet 32 and the width W3 of the third magnet 33; however, the width W1 may be equal to or more than the width W2 and may be equal to or more than the width W3, for example, may be equal to the width W2 and the width W3. Alternatively, the width W1 may be equal to the width W2 and may be wider than the width W3, or may be equal to the width W3 and may be wider than the width W2. In these cases as well, similarly to the embodiment, the reliability of the optical module 1 can be enhanced.

The width W2 of the second magnet 32 and the width W3 of the third magnet 33 may be different from each other. The arrangement of the first magnet 31, the second magnet 32, and the third magnet 33 is not limited to a Halbach array. The first magnet 31 may not be sandwiched between the second magnet 32 and the third magnet 33. For example, the second magnet 32 may be sandwiched between the first magnet 31 and the third magnet 33, or the third magnet 33 may be sandwiched between the first magnet 31 and the second magnet 32. The magnet unit 3 may further include one or more magnets in addition to the first magnet 31, the second magnet 32, and the third magnet 33. The optical module 1 may further include a package accommodating the magnet unit 3.

In the X direction, the outer edge of the mirror unit 2 may be located at the same position as the outer edge of the first magnet 31 or inside the outer edge of the first magnet 31. In the Y direction, the outer edge of the mirror unit 2 may be located outside or inside the outer edge of the first magnet 31.

In the embodiment, the plurality of magnets (the first magnet 31, the second magnet 32, and the third magnet 33) included in the magnet unit 3 are arranged along the X direction; however, the direction in which the magnets are arranged is arbitrarily set as long as the direction is perpendicular to the Z direction. For example, the plurality of magnets included in the magnet unit 3 may be arranged along the Y direction.

The shapes of the first portion 131 and the second portion 132 of the movable portion 13 are not limited. The first portion 131 may be formed in a rectangular shape or elliptical shape when viewed in the Z direction. The second portion 132 may be formed in a circular frame shape or elliptical frame shape when viewed in the Z direction. The shape of the mirror 15 is not limited. The mirror 15 may be formed in an elliptical shape or rectangular shape. In the embodiment, the mirror 15 may be configured as a diffraction grating that diffracts and reflects light. In this case, for example, the mirror 15 may be formed along a predetermined diffraction grating pattern.

In the mirror device 10 of the embodiment, the movable portion 13 is configured to be oscillatable around one axis (axis A); however, the movable portion 13 may be configured to be oscillatable around two axes. In this case, for example, the movable portion 13 includes a first movable portion and a second movable portion having a frame shape and surrounding the first movable portion. The mirror 15 is provided on the first movable portion. The second movable portion is connected to the support portion 11 by the pair of connection portions 14 extending along the axis A, and the first movable portion is connected to the second movable portion by another pair of connection portions extending along an axis perpendicular to the axis A. Accordingly, the second movable portion is rotatable around the axis A, and the first movable portion is rotatable around the axis perpendicular to the axis A. As a result, the mirror 15 (first movable portion) is oscillatable around the two axes. In this case, both the first movable portion and the second movable portion may be statically oscillated, or the first movable portion may be oscillated at a resonant frequency level and the second movable portion may be statically oscillated. Alternatively, in the mirror device 10 of the embodiment, the movable mirror portion 12 is oscillatable around the axis; however, the movable mirror portion 12 may be configured to be reciprocatable along the optical axis direction (direction intersecting the mirror 15).

The shapes of the grooves 23 and the wirings 24 formed in the base 20 are not limited to the above-described shapes. The grooves 23 may not entirely filled with the metal material forming the wirings 24, and only a part of the grooves 23 may be filled therewith. The grooves 23 may not be formed. In this case, the wirings 24 may be formed on the upper surface 20*a* of the base 20. The connection portions of the wirings 24 to the wires 25 may not overlap the first magnet 31, but may overlap the second magnet 32 or the third magnet 33 when viewed in the Z direction. The method for fixing the mirror unit 2 to the magnet unit 3 and the method for fixing the mirror device 10 to the base 20 are not limited, and may be any method.

What is claimed is:

1. An optical module comprising:

a mirror unit including a mirror device including a movable mirror portion provided with a coil; and a magnet unit including a first magnet, a second magnet, and a third magnet arranged along a first direction, and configured to generate a magnetic field acting on the movable mirror portion, wherein the mirror unit is disposed on the magnet unit in a second direction perpendicular to the first direction, a width of the first magnet in the first direction is equal to or more than a width of the second magnet in the first direction and is equal to or more than a width of the third magnet in the first direction, an upper surface of the first magnet is located on a mirror unit side with respect to an upper surface of the second magnet and an upper surface of the third magnet in the second direction, or is located at the same position as one of the upper surface of the second magnet and the upper surface of the third magnet and on the mirror unit side with respect to the other of the upper surface of the second magnet and the upper surface of the third magnet in the second direction, the mirror unit is fixed to at least the upper surface of the first magnet, when viewed from the second direction, the first magnet has a pair of side surfaces opposite to each other in the first direction, each side surface of the pair of side surfaces extends along a third direction perpendicular to the first direction, and the second magnet is fixed to one of the pair of side surfaces, and the third magnet is fixed to the other of the pair of side surfaces, a length of the first magnet in the second direction is longer than a length of the second magnet in the second direction, or longer than a length of the third magnet in the second direction.

2. The optical module according to claim 1, wherein the width of the first magnet in the first direction is wider than the width of the second magnet and the width of the third magnet in the first direction.

3. The optical module according to claim 1, wherein the mirror unit further includes a base to which the mirror device is fixed, and the mirror unit is fixed to at least the upper surface of the first magnet at the base.

4. The optical module according to claim 3, wherein the mirror unit further includes a wire connected to the mirror device and the base, and the wire is connected to the base at a position overlapping the first magnet when viewed in the second direction.

5. The optical module according to claim 4, wherein the base is formed with a wiring to which the wire is connected, and the wiring is formed by disposing a metal material in a groove formed in the base.

6. The optical module according to claim 1, wherein an outer edge of the mirror unit is located outside an outer edge of the first magnet in the first direction.

7. The optical module according to claim 1,
wherein the first magnet, the second magnet, and the third magnet are arranged in a Halbach array.

8. The optical module according to claim 1,
wherein the first magnet is sandwiched between the second magnet and the third magnet in the first direction.

9. The optical module according to claim 1,
wherein the width of the first magnet in the first direction is wider than a width of the movable mirror portion in the first direction.

10. An optical module comprising:
a mirror unit including a mirror device including a movable mirror portion provided with a coil; and
a magnet unit including a first magnet, a second magnet, and a third magnet arranged along a first direction, and configured to generate a magnetic field acting on the movable mirror portion,
wherein the mirror unit is disposed on the magnet unit in a second direction perpendicular to the first direction,
a width of the first magnet in the first direction is equal to or more than a width of the second magnet in the first direction and is equal to or more than a width of the third magnet in the first direction,
an upper surface of the first magnet is located on a mirror unit side with respect to an upper surface of the second magnet and an upper surface of the third magnet in the second direction, or is located at the same position as one of the upper surface of the second magnet and the upper surface of the third magnet and on the mirror unit side with respect to the other of the upper surface of the second magnet and the upper surface of the third magnet in the second direction,
wherein the mirror unit is fixed to the upper surface of the first magnet by an adhesive material, and
the adhesive material is not disposed between the mirror unit and both the upper surface of the second magnet and the upper surface of the third magnet.

11. The optical module according to claim 10,
wherein the width of the first magnet in the first direction is wider than the width of the second magnet and the width of the third magnet in the first direction.

12. The optical module according to claim 10,
wherein the mirror unit further includes a base to which the mirror device is fixed, and
the mirror unit is fixed to at least the upper surface of the first magnet at the base.

13. The optical module according to claim 12,
wherein the mirror unit further includes a wire connected to the mirror device and the base, and
the wire is connected to the base at a position overlapping the first magnet when viewed in the second direction.

14. The optical module according to claim 13,
wherein the base is formed with a wiring to which the wire is connected, and
the wiring is formed by disposing a metal material in a groove formed in the base.

15. The optical module according to claim 10,
wherein an outer edge of the mirror unit is located outside an outer edge of the first magnet in the first direction.

16. The optical module according to claim 10,
wherein the first magnet, the second magnet, and the third magnet are arranged in a Halbach array.

17. The optical module according to claim 10,
wherein the first magnet is sandwiched between the second magnet and the third magnet in the first direction.

18. The optical module according to claim 10,
wherein the width of the first magnet in the first direction is wider than a width of the movable mirror portion in the first direction.

* * * * *